(12) United States Patent
Ghazali et al.

(10) Patent No.: US 12,270,717 B2
(45) Date of Patent: Apr. 8, 2025

(54) OPTICAL FIBER PRESSURE SENSOR AND METHOD OF SENSING THEREOF

(71) Applicant: PETROLIAM NASIONAL BERHAD (PETRONAS), Kuala Lumpur (MY)

(72) Inventors: Ahmad Riza Ghazali, Kuala Lumpur (MY); Mohamad Faizal Bin Abd Rahim, Kuala Lumpur (MY); Mohd Fahmi Azman, Kuala Lumpur (MY); Hairul Azhar Ab Rashid, Kuala Lumpur (MY); M Hafizal Md Zahir, Kuala Lumpur (MY); Mohd Ridzuan Mokhtar, Kuala Lumpur (MY)

(73) Assignee: PETROLIAM NASIONAL BERHAD (PETRONAS), Kuala Lumpur (MY)

( * ) Notice: Subject to any disclaimer, the term of this patent is extended or adjusted under 35 U.S.C. 154(b) by 241 days.

(21) Appl. No.: 17/917,824

(22) PCT Filed: Apr. 8, 2021

(86) PCT No.: PCT/MY2021/050024
§ 371 (c)(1),
(2) Date: Oct. 7, 2022

(87) PCT Pub. No.: WO2021/206537
PCT Pub. Date: Oct. 14, 2021

(65) Prior Publication Data
US 2023/0160765 A1 May 25, 2023

(30) Foreign Application Priority Data
Apr. 8, 2020 (MY) ............................... 2020001820

(51) Int. Cl.
*G01L 1/24* (2006.01)

(52) U.S. Cl.
CPC ..................................... *G01L 1/242* (2013.01)

(58) Field of Classification Search
None
See application file for complete search history.

(56) References Cited

U.S. PATENT DOCUMENTS

| 2003/0174985 A1* | 9/2003 | Eggleton | G02B 6/105 385/11 |
| 2006/0291789 A1* | 12/2006 | Folkenberg | G02B 6/02357 385/123 |

(Continued)

FOREIGN PATENT DOCUMENTS

| JP | 2010-185729 A | 8/2010 | |
| JP | 2015-517678 A | 6/2015 | |
| WO | WO-02103411 A2 * | 12/2002 | ............. G01L 1/242 |

OTHER PUBLICATIONS

International Search Report and Written Opinion of the ISA issued in PCT/MY2021/050024, mailed Sep. 10, 2021; ISA/KR.

*Primary Examiner* — Suman K Nath
*Assistant Examiner* — Nigel H Plumb
(74) *Attorney, Agent, or Firm* — Harness, Dickey & Pierce, P.L.C.

(57) ABSTRACT

An optical fiber for measuring pressure comprising a core for guiding optical signals along a length of the core and a cladding layer including a plurality of stress applying parts disposed around the core. The plurality of stress applying parts are disposed parallel to and symmetrically around the core to induce intensified symmetric shear stress upon application of external pressure while preventing birefringence. The optical fiber provides improved strain sensitivity compared to a standard single-mode optical fiber.

9 Claims, 2 Drawing Sheets

(56) References Cited

U.S. PATENT DOCUMENTS

| | | | |
|---|---|---|---|
| 2008/0196937 A1* | 8/2008 | Okada | H04N 1/1013 174/535 |
| 2012/0234101 A1* | 9/2012 | Vigneaux | G01L 1/246 385/37 |
| 2020/0093384 A1* | 3/2020 | Eberle | A61B 5/6851 |

* cited by examiner

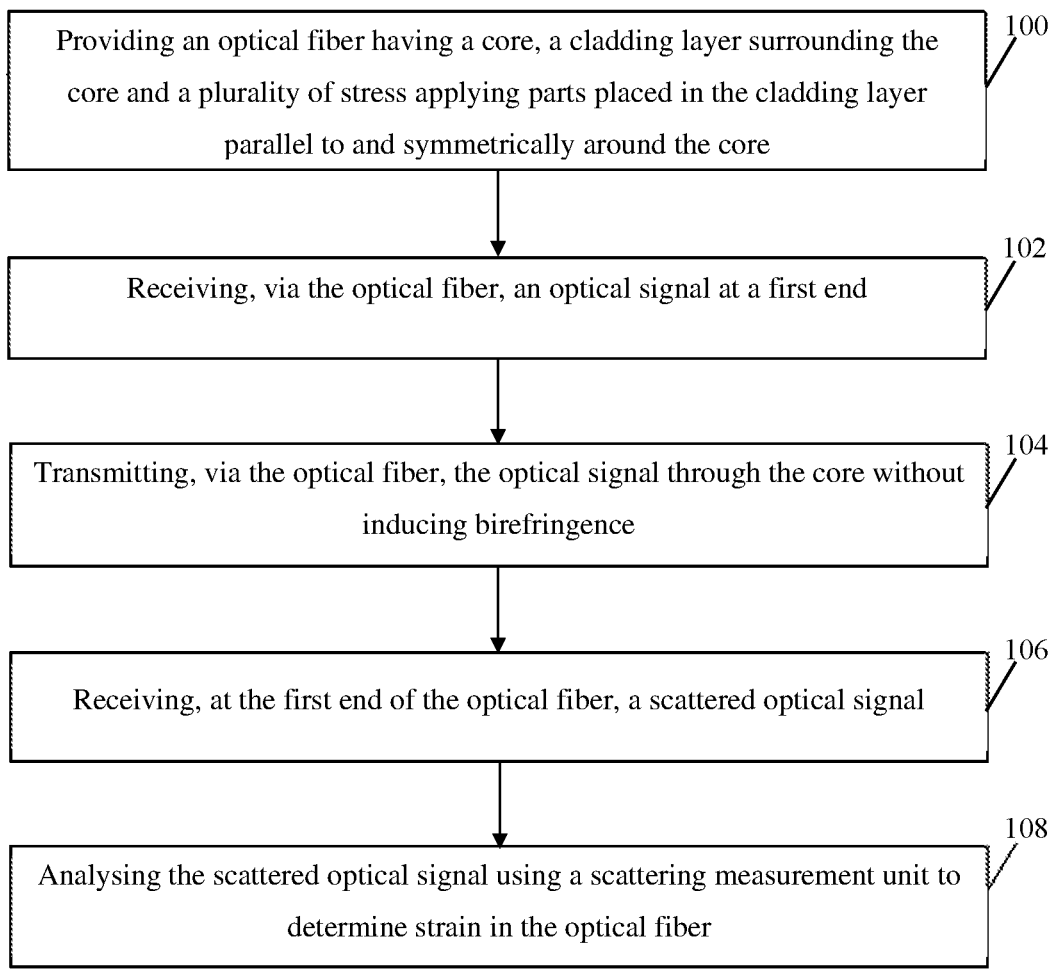

OPTICAL FIBER PRESSURE SENSOR AND METHOD OF SENSING THEREOF

CROSS REFERENCE TO RELATED APPLICATIONS

This application is a U.S. National Phase Application under 35 U.S.C. 371 of International Application No. PCT/MY2021/050024 filed on Apr. 8, 2021, which claims the benefit of priority from Malaysian Patent Application No. PI2020001820, filed Apr. 8, 2020. The entire disclosures of both of the above applications are incorporated herein by reference.

FIELD OF INVENTION

The invention relates to an optical fiber based pressure sensor and a method of sensing pressure along the length of the optical fiber.

BACKGROUND

A wide variety of sensors have been developed using optical fibers for measuring temperature, pressure, force, strain and other parameters. The advantages of optical fiber sensors are their small size, low cost, flexibility and capability to be embedded into other structures. However, most of existing optical fiber pressure sensors require complex fabrication and measurement methods and are inconvenient to be employed in harsh environments such as oil and gas pipes or subterranean oil wells.

A typical optical fiber pressure sensor includes a fiber Bragg grating formed in the core of the optical fiber by doping an optical fiber with a material such as germanium and then exposing the side of the fiber to an interference pattern to produce sinusoidal variations in the refractive index of the core. The center wavelength of the spectral envelope reflected by the fiber Bragg grating changes linearly with temperature and strain. Thus, such changes can be measured to derive strain in the environment of the sensor. However, such fiber Bragg grating pressure sensors are difficult to fabricate and operate and a large number of these discrete sensors are required for high sensitivity pressure sensing along the length of the fiber in harsh environments such as subterranean wells.

Another type of optical fiber pressure sensor includes a polarization maintaining optical fiber, also known as a Birefringent fiber. Such optical fibres include stress applying parts provided on one side or on either side of the core having an elliptic section, or a circular core such that the cladding stress is applied to the core to induce birefringence. However, it is very difficult to use this sensor in most applications requiring high pressure sensitivity. Additional devices need to be installed together with these sensor devices to increase their pressure sensitivity, however this makes it more difficult to manufacture and creates stability and repeatability problems.

An aim of the invention therefore is to provide an optical fiber pressure sensor with high pressure sensitivity for use in harsh environments.

SUMMARY OF INVENTION

In an aspect of the invention, there is provided an optical fiber for measuring pressure comprising:
 a core for guiding optical signals along a length of the core; and
 a cladding layer including a plurality of stress applying parts disposed around the core;
 characterized in that the plurality of stress applying parts are disposed parallel to and symmetrically around the core to induce intensified symmetric shear stress upon application of external pressure while preventing birefringence.

In one embodiment, the cladding layer is fabricated from silica and the stress applying parts are fabricated from at least one of borosilicate ($B_2O_3+SiO_2$), $Al_2O_3+La_2O_3+SiO_2$ or $F+SiO_2$ rods or air holes. The difference in mechanical properties of the silica based cladding layer and the stress applying parts produces intensified symmetrical shear stress upon application of external force. Advantageously, this helps to increase the strain and pressure sensitivity of the optical fiber.

In one embodiment, the stress applying parts are disposed parallel to and symmetrically around the core along the length of the fiber. Advantageously this helps in pressure measurements along the length of the entire optical fiber.

In one embodiment, the optical fiber is a single-mode optical fiber having the stress applying parts arranged within the holes provided in the cladding layer. Advantageously this helps to provide an optical fiber with improved strain and pressure sensitivity but having standard dimensions and standard handling requirements.

Advantageously the symmetrical arrangement of the stress applying parts around the core helps to prevent birefringence, dissimilar modal polarization sensitivity and polarization mode dispersion of the optical signal transmitted through the optical fiber.

In one embodiment, the optical fiber can be used for a plurality of applications including measuring external pressure in subterranean regions, oil wells, other harsh environments and health monitoring of civil and mechanical structures.

In another aspect of the invention, there is provided a method of measuring pressure along a length of an optical fiber, the method comprising:
 providing an optical fiber having a core, a cladding layer surrounding the core and a plurality of stress applying parts placed in the cladding layer parallel to and symmetrically around the core;
 receiving, via the optical fiber, an optical signal at a first end;
 transmitting, via the optical fiber, the optical signal through the core without inducing birefringence;
 receiving, at the first end of the optical fiber, a scattered optical signal; and
 analysing the scattered optical signal using a scattering measurement unit to determine strain in the optical fiber.

In one embodiment, the plurality of stress applying parts includes a pair of rods fabricated from at least one of borosilicate ($B_2O_3+SiO_2$), $Al_2O_3+La_2O_3+SiO_2$ or $F+SiO_2$ or air holes and are placed in the cladding layer to produce intensified symmetric shear stress upon application of external pressure. Advantageously, this helps to increase the strain and pressure sensitivity of the optical fiber.

Advantageously the symmetrical arrangement of the stress applying parts around the core helps to prevent birefringence, dissimilar modal polarization sensitivity and polarization mode dispersion of the optical signal transmitted through the optical fiber.

Advantageously the optical fiber provides improved strain sensitivity compared to a standard single-mode optical fiber.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 3 illustrates a flow diagram showing the steps involved in a method of measuring pressure along a length of an optical fiber shown in FIG. 1 according to an embodiment of the invention.

DETAILED DESCRIPTION

Figure 1:
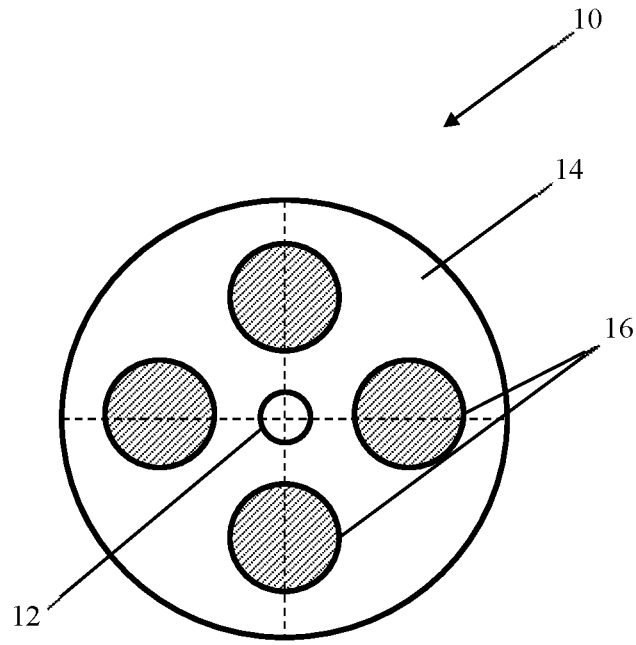
FIG. 1 illustrates a schematic sectional view of an optical fiber having symmetric stress applying parts according to an embodiment of the invention.

With regard to FIG. 1 there is illustrated an optical fiber 10 having a plurality of symmetric stress applying parts 16 according to an embodiment of the invention. The optical fiber 10 comprises a core 12 for guiding optical signals along a length of the core 12 and a cladding layer 14 including the plurality of stress applying parts 16 disposed around the core 12. The plurality of stress applying parts 16 are disposed longitudinally parallel to and symmetrically around the core 12, within the cladding layer 14 to induce intensified symmetric shear stress upon application of external pressure or force on the optical fiber 10.

In one embodiment, the optical fiber 10 is used for the measurement of pressure or force along a length of the optical fiber 10. The core 12 of the optical fiber 10 is fabricated from germanium doped silica ($GeO_2+SiO_2$) having a refractive index $n_1$. The core 12 is surrounded by the cladding layer 14 fabricated from silica ($SiO_2$) having a refractive index of $n_2$, ($n_1 > n_2$). In one embodiment, the stress applying parts 16 disposed within the cladding layer 14 are fabricated from borosilicate ($B_2O_3+SiO_2$) rods. In alternate embodiments, the stress applying parts 16 are fabricated from $Al_2O_3+La_2O_3+SiO_2$ or $F+SiO_2$ rods. In another embodiment, air holes are provided as the stress applying parts 16. The difference in mechanical properties of the silica based cladding layer 14 and the stress applying parts 16 produces intensified symmetrical shear stress upon application of homogeneous external pressure or force on the optical fiber 10. Advantageously, this helps to increase the strain and pressure sensitivity of the optical fiber 10 based pressure sensor.

In one embodiment, the optical fiber 10 can be utilized for the measurement of external pressure or force in subterranean oil wells and other harsh environments. In an embodiment, the optical fiber 10 can be utilized for the structural health monitoring of civil structures. In a yet another embodiment, the optical fiber 10 can be utilized for the structural health monitoring of mechanical structures such as railway tracks. When the fiber is exposed to hydrostatic pressure, the force is converted to strain and the cable elongates due to the Poisson effect. In the prior art, the stress applying parts have different mechanical properties such that the effects of birefringence can be used to measure pressure. However, according to the invention the symmetric arrangement of the stress applying parts 16 around the core 12 helps to create symmetrical shear stress and to prevent the occurrence of birefringence while passing the optical signals through the core 12. The pressure or force on the optical fiber 10 is measured by analysing the effect of strain on the scattering of the optical signal transmitted through the core 12. The absence of birefringence prevents dissimilar modal polarization sensitivity and polarization mode dispersion of the optical signals transmitted through the optical fiber 10 thereby improving the accuracy of measurements for a given strain compared to previously known methods.

In one embodiment, a method of fabricating the optical fiber 10 for pressure measurements is disclosed. The method includes the steps of forming a preform comprising the core 12 fabricated from germanium doped silica ($GeO_2+SiO_2$) having a refractive index $n_1$. The core 12 is surrounded by the cladding layer 14 fabricated from silica ($SiO_2$) having a refractive index of $n_2$, ($n_1 > n_2$). Two orthogonal pairs of holes, parallel and symmetrical to the core 12 are drilled through the cladding layer 14 to incorporate the stress applying parts 16. The stress applying parts 16 can be of any desired shape such as cylindrical or polygonal shape. The preform thus formed is drawn or extruded to form a single-mode optical fiber 10 having the core 12 at the centre and the cladding layer 14 including the stress applying parts 16 surrounding the core 12.

In another embodiment, the fabrication of the optical fiber 10 includes the steps of forming the preform of the optical fiber 10 by stacking silica rods around the germanium-doped silica rod within a large silica tube. This arrangement of the germanium-doped silica rod forms the core 12 and the arrangement of the silica rods 14 forms the cladding layer 14. An orthogonal pair of borosilicate ($B_2O_3+SiO_2$), $Al_2O_3+La_2O_3+SiO_2$ or $F+SiO_2$ rods or air holes stacked symmetrically around the germanium-doped silica rod forms the stress applying parts 16. The stacked rods in the silica tube is then fused and drawn to form the intermediate preform. The intermediate preform thus formed is drawn or extruded to form a single-mode optical fiber 10 having the core 12 at the center and the cladding layer 14 including the stress applying parts 16 surrounding the core 12.

Typically, the optical fiber 10 thus formed has a dimension of approximately 125 μm with the core 12 having a dimension of approximately 8.2 μm and each of the stress applying parts 16 has a dimension of 36 μm.

Figure 2:
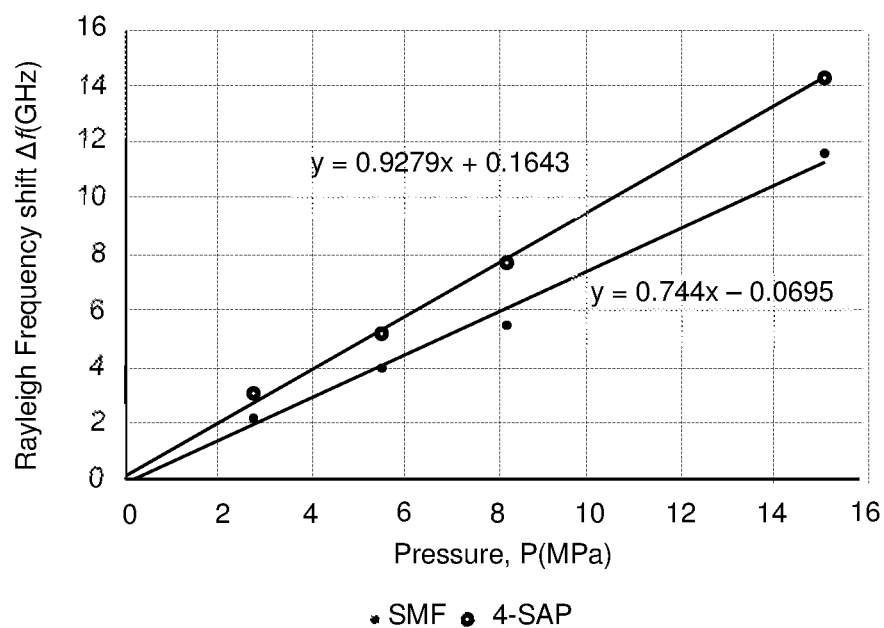
FIG. 2 is a plot illustrating the frequency shift in the scattered optical signal through the optical fiber in FIG. 1 upon application of varying external pressures.

With regard to FIG. 2 there is illustrated a plot of the frequency shift in the scattered optical signal through the optical fiber 10 upon application of varying external pressures. The difference in mechanical properties of the silica based cladding layer 14 and the stress applying parts 16 placed parallel to and on either side of the core 12 and lying in planes passing through the core 12 induces intensified symmetrical shear stress upon application of the external pressure or force on the optical fiber 10. The enhanced symmetrical shear stress on the optical fiber 10 provides magnification of applied force to strain conversion upon the application of external force, which helps to improve the strain and pressure sensitivity of the optical fiber 10 based pressure sensor by at least 21% compared to a standard single-mode optical fiber (SMF). Further, the optical fiber 10 based pressure sensor with the stress applying parts 16 provides negligible hysteresis compared to the standard single-mode optical fiber upon application of external force.

With regard to FIG. 3 there is illustrated a flow diagram showing the steps involved in a method of measuring pressure using the present optical fiber 10, according to an embodiment of the invention. The method of measuring pressure or force along a length of the optical fiber 10 comprises the step of providing the optical fiber 10 having the core 12, cladding layer 14 surrounding the core 12 and the plurality of stress applying parts 16 placed in the cladding layer 14 parallel to and symmetrically around the core 12, as shown in block 100. An optical signal is received at a first end of the optical fiber 10, as in block 102. The optical fiber 10 transmits the received optical signal through the core 12 without inducing birefringence, as shown in block 104. The optical signal is transmitted through the optical fiber 10 in absence of birefringence, dissimilar modal polarization sensitivity and polarization mode dispersion. The optical signal transmitted through the optical fiber 10 is scattered with magnitude affected by the strain on the optical fiber 10. The scattered optical signal is received at the first end of the optical fiber 10, as in block 106. A scattering measurement unit is utilized to analyse the scattered optical signal to determine the strain in the optical fiber 10, as shown in block 108. In one embodiment, the scattering measurement unit identifies the unique scattering spectrum or intensity of the scattered optical signal and subsequently determine the strain in the optical fiber 10. The orthogonal pair of stress applying parts 16 such as the Borosilicate rods 16 placed in the cladding layer 14 induces intensified symmetric shear stress upon application of external pressure, which in turn provides improved strain sensitivity compared to a standard single-mode optical fiber.

It will be appreciated by persons skilled in the art that the present optical fiber based pressure sensor may also include additional symmetrical stress applying parts around the core to further improve the strain sensitivity.

It will also be appreciated by persons skilled in the art that the present invention may also include further additional modifications made to the fiber or method which does not affect the overall functioning of the fiber or method.

The invention claimed is:

1. An optical fiber for measuring pressure comprising:
a core for guiding optical signals along a length of the core; and
a cladding layer including a plurality of stress applying parts disposed around the core;
characterized in that the plurality of stress applying parts are disposed within an orthogonal pair of holes provided parallel to and symmetrically around the core to induce intensified symmetric shear stress upon application of external pressure while preventing birefringence.

2. The optical fiber according to claim 1 wherein the stress applying parts are fabricated from at least one of borosilicate ($B_2O_3+SiO_2$), $Al_2O_3+La_2O_3+SiO_2$ or $F+SiO_2$ rods or air holes.

3. The optical fiber according to claim 1 wherein difference in mechanical properties of the cladding layer and the stress applying parts induces intensified symmetric shear stress upon application of external pressure.

4. The optical fiber according to claim 1 wherein the optical fiber is a single-mode optical fiber.

5. The optical fiber according to claim 1 wherein the optical fiber is used for a plurality of applications including measuring external pressure in a subterranean well and health monitoring of civil and mechanical structures.

6. A method of measuring pressure along a length of an optical fiber comprising:
providing the optical fiber having a core, a cladding layer surrounding the core and a plurality of stress applying parts placed within an orthogonal pair of holes provided in the cladding layer parallel to and symmetrically around the core;
receiving, via the optical fiber, an optical signal at a first end;
transmitting, via the optical fiber, the optical signal through the core without inducing birefringence;
receiving, at the first end of the optical fiber, a scattered optical signal; and
analysing the scattered optical signal using a scattering measurement unit to determine strain in the optical fiber.

7. The method according to claim 6 wherein the plurality of stress applying parts includes a pair of rods fabricated from at least one of borosilicate ($B_2O_3+SiO_2$), $Al_2O_3+La_2O_3+SiO_2$ or $F+SiO_2$ or air holes and are placed in the cladding layer to produce intensified symmetric shear stress upon application of external pressure.

8. The method according to claim 6 wherein the optical signal is transmitted through the optical fiber in absence of birefringence, dissimilar modal polarization sensitivity and polarization mode dispersion.

9. The method according to claim 6 provides improved strain sensitivity to the optical fiber compared to a standard single-mode optical fiber.

* * * * *